UNITED STATES PATENT OFFICE.

FRANKLIN BAKER, JR., OF PHILADELPHIA, PENNSYLVANIA.

PROCESS OF PREPARING OR TREATING COCOANUT AND PRODUCT OBTAINED THEREBY.

1,230,364.     Specification of Letters Patent.     Patented June 19, 1917.

No Drawing.     Application filed May 11, 1916. Serial No. 96,920.

*To all whom it may concern:*

Be it known that I, FRANKLIN BAKER, Jr., a citizen of the United States, residing in Philadelphia, Pennsylvania, have invented a Process of Preparing or Treating Cocoanut and Product Obtained Thereby, of which the following is a specification.

My invention relates to the preparation, preservation and packing of fresh cocoanut, that is to say the meat or kernel of the fruit with the original milk, whereby it will keep in a fresh state for a relatively indefinite length of time. The desiccation of cocoanut is an old and well known process; in fact many methods have been developed in which the desiccation of the meat of the cocoanut kernel forms a necessary or important part but, as the name implies, all of this work has resulted in the production of a dry product and, in all instances, some other material, usually a preservative, or sugar has been added to the cocoanut.

The essential object of my invention is to provide a preserved cocoanut product, with nothing added, that has the original moisture, dampness and condition of fresh grated or shredded cocoanut; the milk originally with the cocoanut being in most instances preserved with the shredded or grated mass of the kernel, and the whole packed in cans, glasses or any other suitable form of receptacles which are hermetically sealed.

In carrying my process into effect, the cocoanuts are opened, the milk carefully drained from the same and saved; the kernel or meat of the cocoanut is shredded or grated by any approved or well known means, and then the shredded or grated cocoanut is placed in the cans or other receptacles in which it is to be packed for sale and subsequent use.

In the meanwhile, the milk of the cocoanuts thus prepared has been heated, being raised to a temperature substantially, but not exceeding, that of the boiling point of water, and after the cans have been substantially filled with the shredded or grated cocoanut, a portion of this milk, the amount used being directly proportionate to the amount of cocoanut in the cans, may be poured into the latter.

The cans are then hermetically sealed and placed in a retort or steam chest into which steam is introduced and kept under pressure; the contents of the cans being raised to a temperature sufficient to kill any bacteria present in the cocoanut or the milk. This temperature will vary depending upon a number of factors. In my work I have found that a temperature at or slightly in excess of 212° F. may be sufficient under some conditions. Generally speaking and for the meat of most cocoanuts, the temperatures may range from 215° F. to 225° F.; the critical temperature being about 220° F. The cans with the contained cocoanut and heated milk are maintained at the desired temperature until the cocoanut has been thoroughly heated through and the bacteria thereof destroyed.

The usual period of time for this heat treatment is approximately one-half hour, although in some instances, it may be necessary or desirable to raise the temperature in the steam pressure chamber to a much higher point, approximately 250° F., for a short period of time, and this may be necessary when treating some kinds of cocoanut in which the bacteria present can only be destroyed at the higher heat. This higher temperature is maintained for approximately five minutes. The cans are then withdrawn and allowed to cool at room temperature, and the product is then ready for market and subsequent use.

It will be understood, of course, that the bacterial content of the meat or kernel of the cocoanut and the milk varies within certain limits. In the treatment of cocoanut, therefore, while all of the bacteria of the contents of certain cocoanuts may be killed at the lower temperatures, others may require the higher temperatures.

In all instances the high temperature treatment is for a shorter length of time than the treatment at the lower temperatures and such high temperature treatment follows treatment at the lower temperatures so that the material can be raised to the higher temperatures in a relatively short period of time. In this method of procedure, no harm to the product will result in the operation of destroying the bacteria present.

In the preparation of my improved cocoanut product preserved and packed in cans or other receptacles, the heat treatment is the important factor and this must be sufficient to kill the bacteria present in the raw cocoanut and the milk thereof. In some cases, however, where it is not desired to keep the packed cocoanut for any length of time as, for instance, where its use is local or at points directly convenient to the point of manufacture, it will safely keep for short periods of time in hermetically sealed packages when treated or exposed to the lower temperatures. These temperatures, under the conditions noted, will be sufficient to kill most of the bacteria present and preserve the product in a perfectly sweet condition for a limited length of time. This is particularly desirable when the goods are used by confectioners and where final use may be effected in a relatively short time after packaging.

While in most instances the original milk will be packed with the cocoanut product, it may be desirable to omit the greater portion or all of it in some instances. When used it is always heated to a temperature of approximately 212° F., before it is added to the shredded, grated or otherwise prepared cocoanut placed in the cans or other receptacles.

The finished treated produce when ready for use, after cooling, will be found to be as fresh and moist as the grated or shredded cocoanut direct from the fresh green nut, and it may be used for all purposes for which the fresh product is employed.

This is believed to be the first instance where cocoanut is packed in a moist condition with or without the original milk, and without the addition of any ingredient of any nature, or anything in the nature of a preservative.

Reference in the claims to the step of cutting, grating, shredding, or comminuting the cocoanut kernel is not to be construed as limiting my invention to any exact manner of preparing the kernel; such language being intended to include any method or means of finely dividing the kernel to make it readily available in carrying out my improved process and for subsequent use as an article of food.

I claim:

1. The process of preserving cocoanut in a natural moist condition, which consists in separating the milk from the kernel, cutting, grating, or shredding the kernel, packing the same in receptacles, hermetically sealing the receptacles with a portion of the milk, and then subjecting the hermetically sealed receptacles to a high temperature sufficient to kill the bacteria present in the cocoanut.

2. The process of preserving cocoanut in a natural moist condition with the original milk, which consists in separating the milk from the kernel, cutting, grating, or shredding the kernel, packing the same in receptacles, heating the milk, introducing a portion of the heated milk into the receptacles with the prepared kernel, hermetically sealing the receptacles, and then subjecting the hermetically sealed receptacles to a high temperature sufficient to kill the bacteria present in the cocoanut.

3. The process of preserving cocoanut in a natural moist condition with the original milk, which consists in separating the milk from the kernel, cutting, grating or shredding the kernel, packing the same in receptacles, heating the milk, introducing a portion of the heated milk into the receptacles with the prepared kernel, hermetically sealing the receptacles in which the cocoanut kernel and milk is placed, and then subjecting the hermetically sealed receptacles to a temperature approximating 220° F., for approximately one-half hour.

4. The process of preserving cocoanut in a natural moist condition with the original milk, which consists in separating the milk from the kernel, cutting, grating or shredding the kernel, packing the shredded cocoanut in receptacles, heating the milk of the cocoanut to a temperature of approximately 212° F., introducing a portion of the heated milk into the shredded mass of the kernel, hermetically sealing the receptacles in which the shredded cocoanut and milk are placed, and then subjecting the hermetically sealed receptacles to a high temperature sufficient to kill the bacteria present in the cocoanut and the milk thereof.

5. The process of preserving cocoanut in a natural moist condition with the original milk, which consists in separating the milk from the kernel, cutting, grating or shredding the kernel, packing the shredded cocoanut in cans, heating the milk of the cocoanut to a temperature approximating 212° F., introducing a portion of the heated cocoanut milk into the shredded mass of the kernel, hermetically sealing the cans in which the shredded cocoanut and milk are placed, then subjecting the hermetically sealed cans to a high temperature approximating 220° F. for a period of time approximating one-half hour, and finally cooling the contents of the filled cans.

6. The process of preserving cocoanut in a natural moist condition, which consists in separating the milk from the kernel, cutting, grating or shredding the kernel, packing the same in receptacles, hermetically sealing the receptacles in which the cocoanut kernel is placed, subjecting the hermetically sealed receptacles to a temperature approximating 220° F., for approximately one-half hour, and increasing the temperature to approximately 250° F. for a short period of time.

7. The process of preserving cocoanut in a natural moist condition with the original milk, which consists in separating the milk from the kernel, cutting, grating or shredding, preparing the kernel, packing the shredded cocoanut in cans, heating the milk of the cocoanut to a temperature approximating 212° F., introducing a portion of the heated cocoanut milk into the shredded mass of the kernel, hermetically sealing the cans in which the shredded cocoanut and milk are placed, then subjecting the hermetically sealed cans to a high temperature approximating 220° F. for a period of time approximating one-half hour, increasing the temperature to approximately 250° F. for a short period of time, and finally cooling the contents of the filled cans.

8. As a new article of manufacture, a completely sterilized mass of cocoanut in a shredded or comminuted state together with its original milk.

9. As a new article of manufacture, a hermetically sealed completely sterilized package of cocoanut kernel in a shredded or comminuted state together with its original milk.

FRANKLIN BAKER, Jr.